US012635672B2

(12) United States Patent
Stern

(10) Patent No.: US 12,635,672 B2
(45) Date of Patent:      May 26, 2026

(54) RETRACTABLE DOG LEASH

(71) Applicant: Analytical Horsepower LLC,
Melbourne, FL (US)

(72) Inventor: James E. Stern, Greenville, KY (US)

(73) Assignee: Analytical Horsepower LLC,
Melbourne, FL (US)

( * ) Notice: Subject to any disclaimer, the term of this
patent is extended or adjusted under 35
U.S.C. 154(b) by 0 days.

(21) Appl. No.: 18/940,594

(22) Filed: Nov. 7, 2024

(65) Prior Publication Data

US 2025/0143266 A1      May 8, 2025

Related U.S. Application Data

(60) Provisional application No. 63/596,721, filed on Nov.
7, 2023.

(51) Int. Cl.
*A01K 27/00*        (2006.01)

(52) U.S. Cl.
CPC .................................. *A01K 27/004* (2013.01)

(58) Field of Classification Search
CPC ... A01K 27/004; A01K 27/005; A01K 27/003
See application file for complete search history.

(56) References Cited

U.S. PATENT DOCUMENTS

| | | | | |
|---|---|---|---|---|
| 870,784 | A * | 11/1907 | Huff ..................... | A01K 27/004 |
| | | | | 119/794 |
| 3,150,843 | A * | 9/1964 | Cordoba ................ | A01K 89/00 |
| | | | | 242/380 |
| 4,165,713 | A * | 8/1979 | Brawner .............. | A01K 27/004 |
| | | | | 16/445 |
| 4,197,817 | A * | 4/1980 | Crutchfield .......... | A01K 27/004 |
| | | | | 119/794 |
| 2006/0054108 | A1* | 3/2006 | Eulete .................. | A01K 27/004 |
| | | | | 119/798 |
| 2010/0037832 | A1* | 2/2010 | Smith .................. | A01K 27/004 |
| | | | | 119/796 |
| 2016/0270373 | A1* | 9/2016 | Bova ..................... | A01K 27/005 |
| 2017/0000089 | A1* | 1/2017 | Woods ................. | A01K 27/009 |
| 2018/0242557 | A1* | 8/2018 | Woods ................. | A01K 27/004 |

OTHER PUBLICATIONS

KEY-BAK-mid6-heavy-duty-retractable-keychain [online]. KEY-
BACK [retrieved on Nov. 7, 2024]. Retrieved from Internet: <https://
www.keybak.com/collections/all-products/products/mid6-heavy-
duty-retractable-keychain>. (PDF—3 pages).

* cited by examiner

*Primary Examiner* — Kristen C Hayes
(74) *Attorney, Agent, or Firm* — Taft Stettinius &
Hollister LLP; William K. Broman

(57)        ABSTRACT
An assembly comprises a retractor having a first face, a
second face, and a body. The first face being spaced from the
second face on an axis. The body extending between the first
face and the second face along the axis. A clip that is
supported on the second face. A handle that has a stowed
position. The handle in the stowed position is adjacent the
body. The handle is retractably connected to the retractor.

20 Claims, 9 Drawing Sheets

RETRACTABLE DOG LEASH

CROSS-REFERENCE TO RELATED APPLICATION

This application claims the benefit of and priority to U.S. Provisional Patent Application No. 63/596,721, filed Nov. 7, 2023, the disclosure of which is incorporated herein by reference in its entirety.

BACKGROUND

Training of a dog or other pet can be done using various techniques and devices. These techniques and devices include use of a leash or lead. The pet owner or handler can control the dog when the leash is connected to the dog, e.g., connected via a collar or harness.

DETAILED DESCRIPTION

Figure 1:
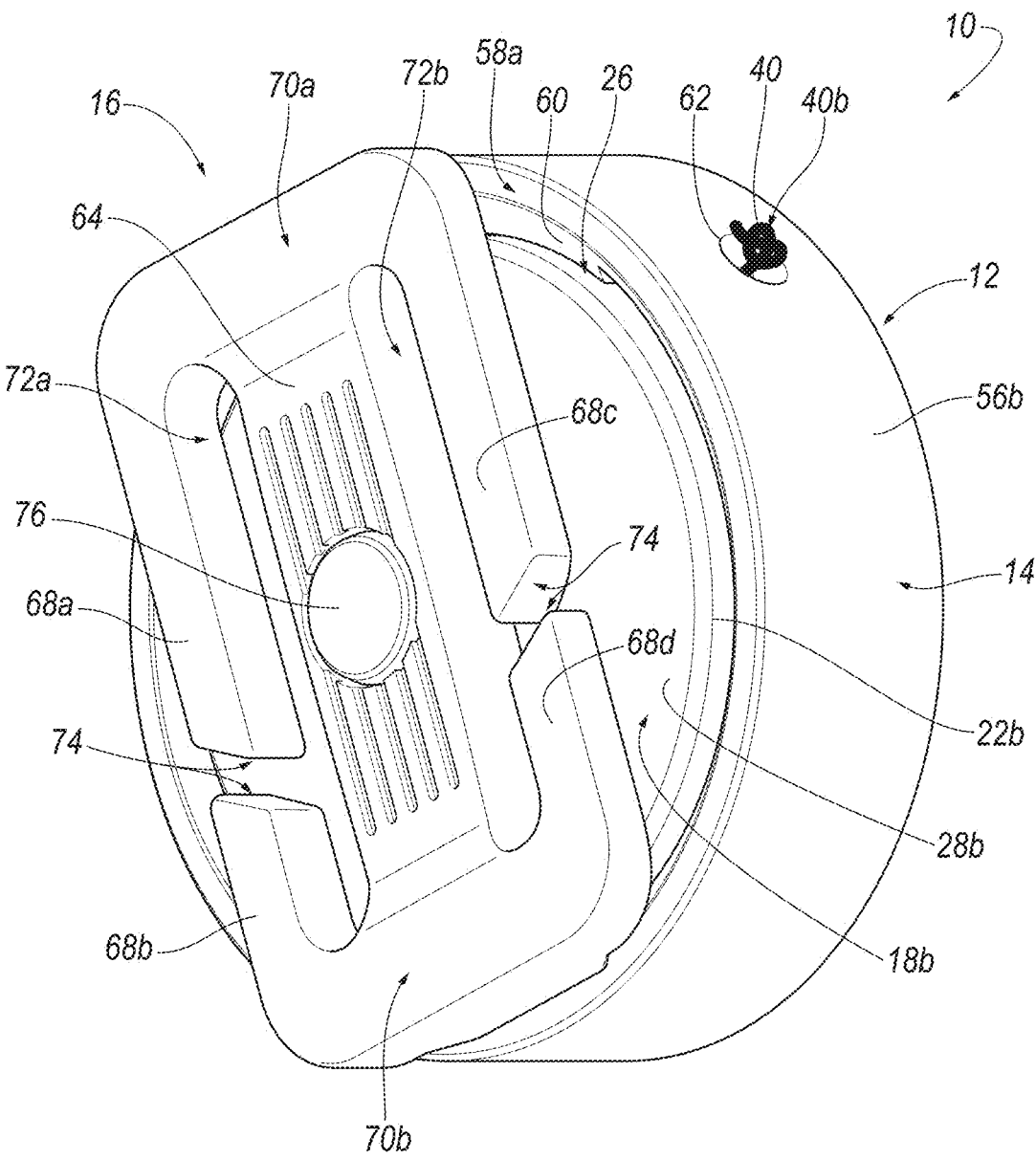
FIG. 1 is a perspective view of an assembly for a retractable dog leash with a handle in a stowed position according to some embodiments of the disclosed technology.
Figure 2:
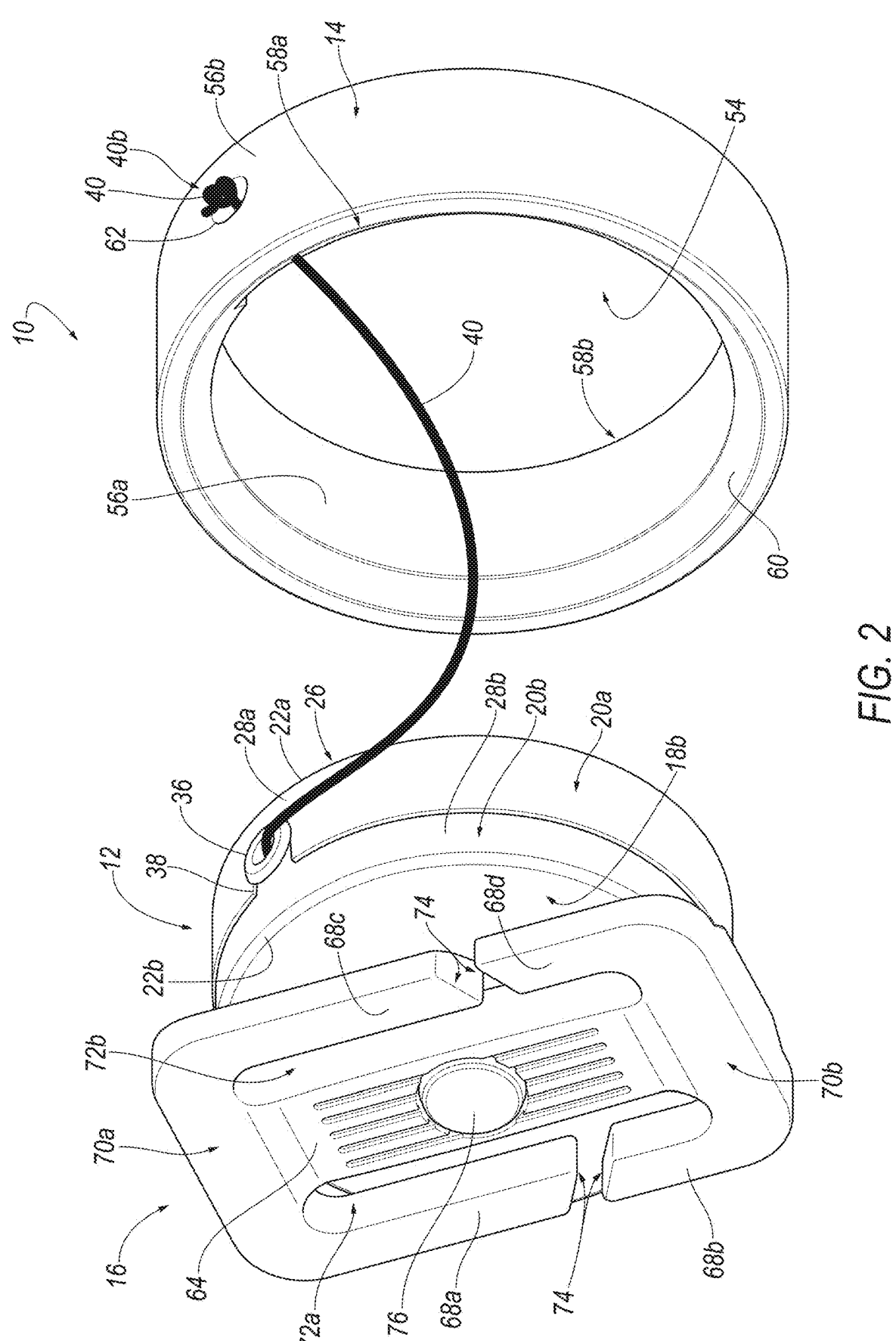
FIG. 2 is a perspective view of the assembly with the handle in a deployed position.

An assembly comprises a retractor having a first face, a second face, and a body. The first face being spaced from the second face on an axis. The body extending between the first face and the second face along the axis. A clip that is supported on the second face. A handle that has a stowed position. The handle in the stowed position is adjacent the body. The handle is retractably connected to the retractor.

The assembly may include a cord having a first end and a second end spaced from the first end, the cord being connected to the handle at the first end and being connected to the retractor at the second end.

The handle may be retractably connected to the retractor by the cord.

The cord may have a tensile strength of at least 2,500 MPa.

A cavity may be defined by the first face, the second face, and the body, the retractor may include a winding assembly disposed in the cavity.

A cord may be connected to the winding assembly.

The winding assembly may include an outer wall, a first flange, and a second flange, the cord being wrapped around the outer wall between the first flange and the second flange when the handle is in the stowed position.

The cord may be disposed between the outer wall and the body of the retractor when the handle is in the stowed position.

The first flange may be adjacent the first face.

The second flange may be adjacent the second face.

The retractor may include an enclosure and a winding assembly disposed within the enclosure.

The enclosure may be defined by the first face, the second face, and the body.

The handle in the stowed position may be supported on the enclosure.

The retractor and the handle may be cylindrical and concentrically mated together when the handle is in the stowed position.

The handle may include a first wall and a second wall radially spaced from the first wall, the first wall being between the body and the second wall when the handle is in the stowed position.

The handle may have a first end, the first end being flush with the first face of the retractor when the handle is in the stowed position.

The clip may include a clip body and a plurality of arms extending from the clip body, the plurality of arms being L-shaped.

The clip body may have a first end and a second end, the plurality of arms may include a first arm, a second arm, a third arm, and a fourth arm, the first arm and the third arm being connected to the first end of the clip body and extending away from the clip body and extending toward the second end, the second arm and the fourth arm being connected to the second end of the clip body and extending away from the clip body and extending toward the first end.

An assembly comprises an enclosure having a front cover and a rear cover. A winding assembly is disposed within the enclosure between the front cover and the rear cover. A handle has an inner wall and an outer wall. A cord having a first end connected to the handle and a second end connected to the retractor. The handle is moveable between a deployed position and a stowed position. The handle in the stowed position is supported on the enclosure. The inner wall of the handle is between the enclosure and the outer wall of the handle when the handle is in the stowed position. The first end of the cord passes from the inner wall of the handle to the outer wall of the handle, the first end of the cord terminating in a knot, the knot abutting the outer wall. A clip is mounted on the enclosure for attachment to a collar.

The clip may include a body and a plurality of arms extending from the body, the plurality of arms being L-shaped, and the body has a first end and a second end, the plurality of arms include a first arm, a second arm, a third arm, and a fourth arm, the first arm and the third arm being connected to the first end of the body and extending away from the body and extending toward the second end, the second arm and the fourth arm being connected to the second end of the body and extending away from the body and extending toward the first end.

With reference to the Figures, an assembly 10 for a retractable dog leash is shown. The assembly includes a retractor 12, a handle 14, and a clip 16. The retractor 12 has a first face 18a, a second face 18b, and a body 20. The first face 18a of the retractor 12 is spaced from the second face 18b of the retractor 12 along an axis A1. The body 20 extends between the first face 18a and the second face 18b along the axis A1. The assembly includes the clip 16. The clip 16 is supported on the second face 18b of the retractor 12. The assembly includes the handle 14 having a stowed position. The handle 14 in the stowed position is adjacent the body 20. The handle 14 is retractably connected to the retractor 12.

Pet owners often use a leash or lead when walking, exercising, training, or otherwise handling their pets, e.g., a dog or child. Because assembly can be attached to the dog's collar via the clip 16, and the handle 14 fits around the enclosure assembly in the stowed position and is held in place under tension, the pet owner/dog handler is able to have the leash attached to their dog without needing to always have the leash deployed. Since the leash can be constantly attached to the dog, the owner/handler can quickly get control of the dog when it is needed without the need for a bulky leash that bothers the dog or gets caught on objects in the dog's environment, e.g., trees, furniture, etc.

The retractor 12 includes the first face 18a and the second face 18b. The first face 18a is spaced from the second face 18b along the axis A1. In the example shown in the figures, the first face 18a and the second face 18b are circular. In other words, the first face 18a and the second face 18b extend radially outward from the axis A1. Each of the first face 18a and the second face 18b have an outer edge 22a, 22b. The first face 18a and the second face 18b may extend continuously from the axis A1 to the outer edge 22a, 22b. Specifically, the first face 18a and the second face 18b may extend continuously from the axis A1 and terminate at the outer edge 22a, 22b.

The retractor 12 includes the body 20. The body 20 is elongated between the first face 18a and the second face 18b along the axis A1. The body 20 may be elongated from the first face 18a to the second face 18b along the axis A1. In the example shown in the Figures, the body 20 extends from the outer edge 22a of the first face 18a to the outer edge 22b of the second face 18b. The body 20 may be, for example, ring-shaped. The retractor 12, i.e., the first face 18a, the second face 18b, and the body 20, may be cylindrical. The first face 18a, the second face 18b, and the body 20 may define a retractor cavity 24. The first face 18a, the second face 18b, and the body 20 may define an enclosure assembly 26. Specifically, the enclosure assembly 26 may define the retractor cavity 24.

Figure 3:
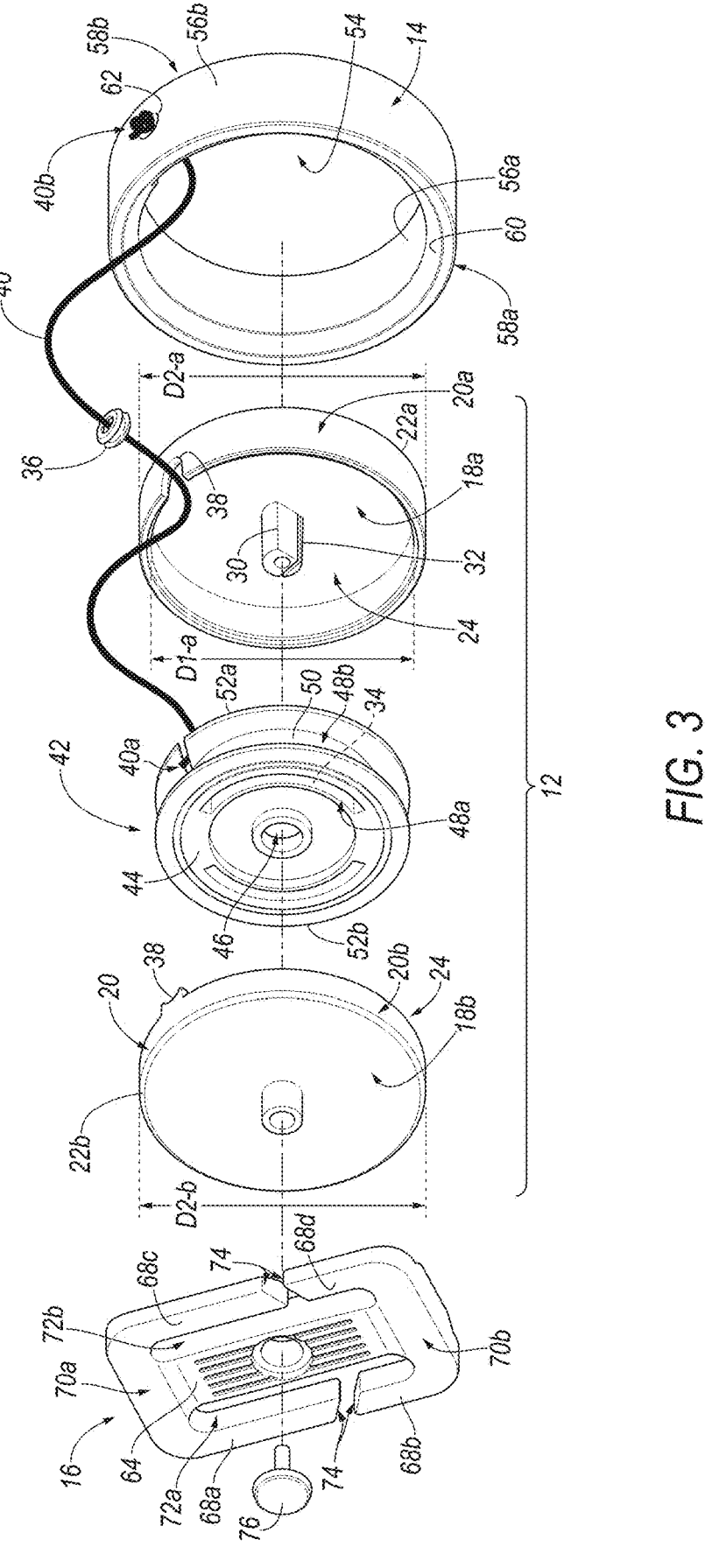
FIG. 3 is an exploded perspective view of the assembly as viewed from the clip side.
Figure 4:
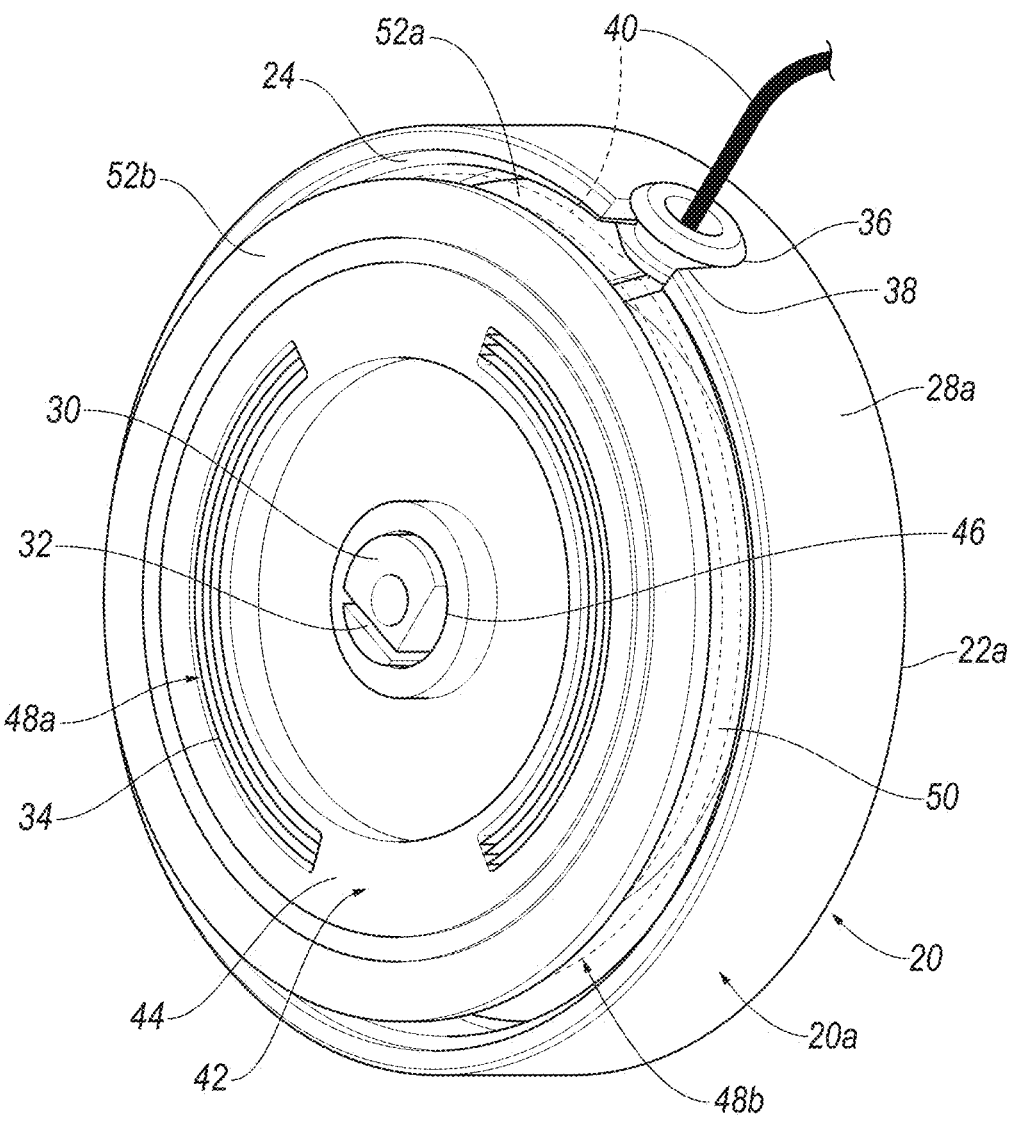
FIG. 4 is a perspective view of a winding assembly and a front cover of an enclosure assembly according to some embodiments of the disclosed technology.
Figure 5:
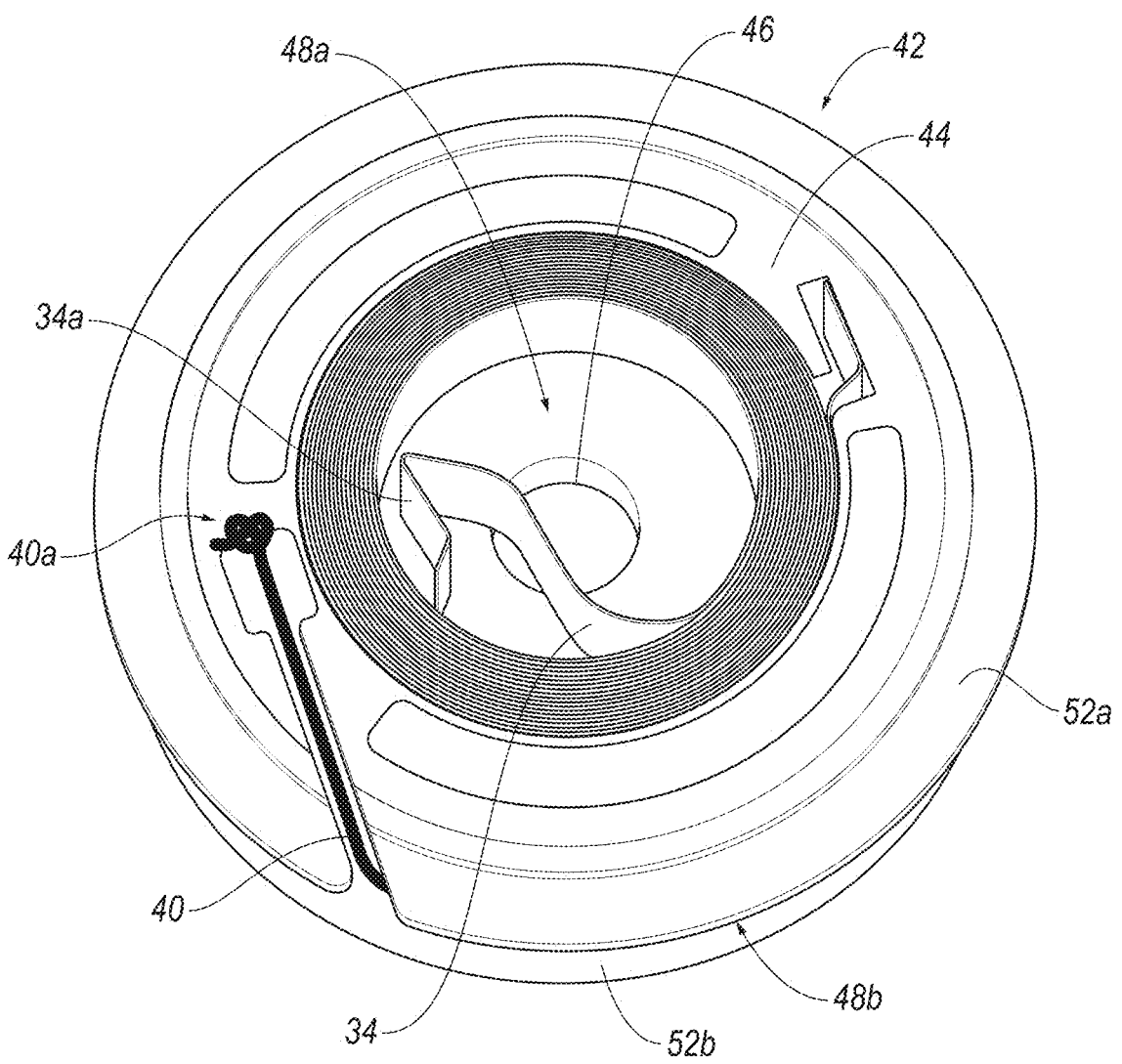
FIG. 5 is a perspective view of the winding assembly with a spring.
Figure 8:
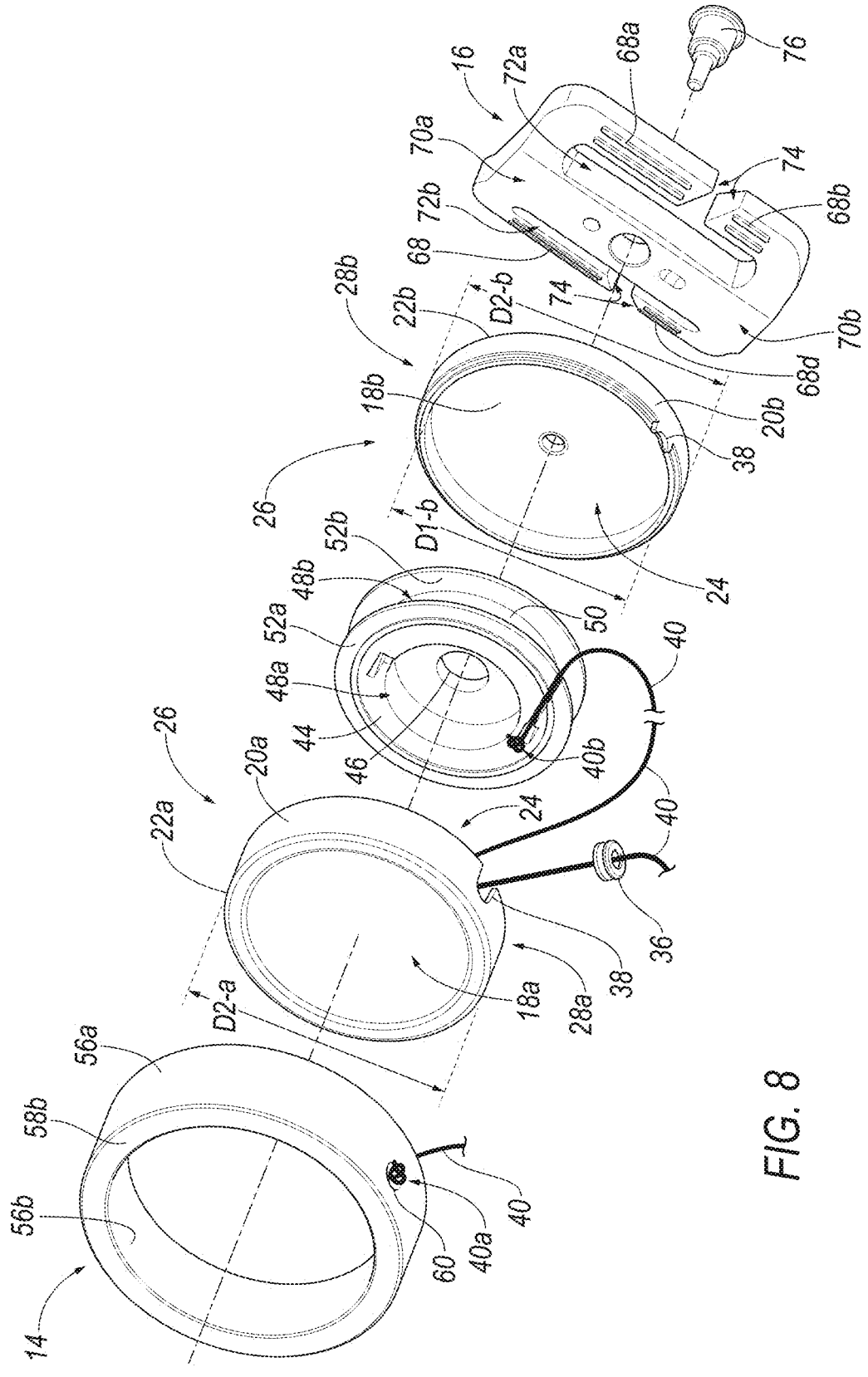
FIG. 8 is an exploded perspective view of the assembly as viewed from the retractor side.
Figures 9A, 9B:
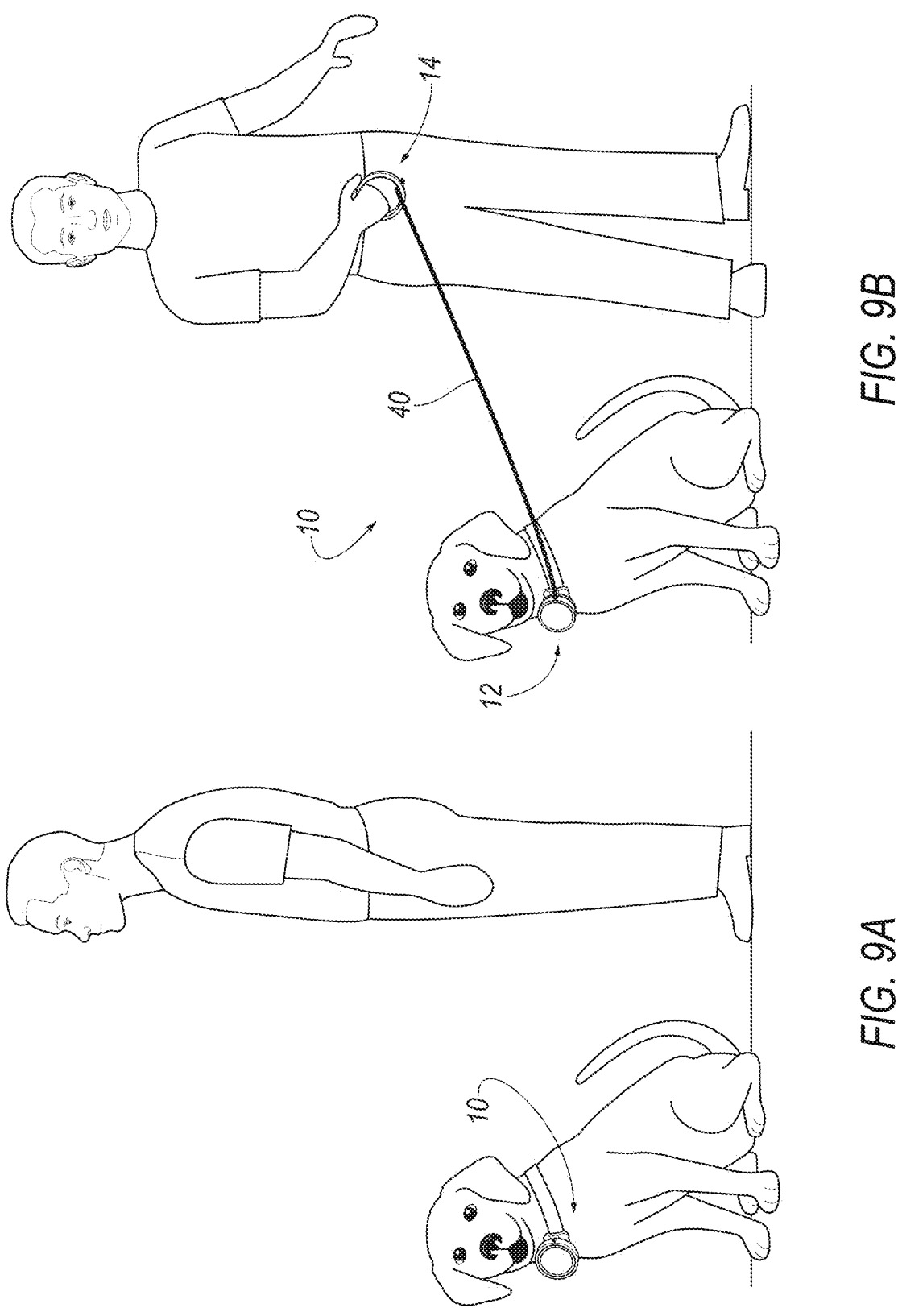
FIG. 9A is a perspective view of the assembly with the handle in the stowed position and the assembly attached to a pet collar.
FIG. 9B is a perspective view of the assembly with the handle in the deployed position and the assembly attached to the pet collar.

As shown in FIGS. 3 and 8, the first face 18a may be attached to a first portion 20a of the body 20 and the second face 18b may be attached to a second portion 20b of the body 20. In this example, the first portion 20a of the body 20 may be spaced outwardly from the second portion 20b of the body 20. The first portion 20a of the body 20 and the second portion 20b of the body 20 each have an inner diameter D1-a, D1-b and an outer diameter D2-a, D2-b. Specifically, the inner diameter D1-a of the first portion 20a of the body 20 is larger than the outer diameter D2-b of the second portion 20b of the body 20. In this example, the first face 18a and the first portion 20a and the second face 18b and the second portion 20b may be formed separately and subsequently assembled, e.g., by fasteners, welding, adhesive, etc.

The first face 18a and/or the second face 18b may be unitary with the body 20. Specifically, the first face 18a may be unitary with the first portion 20a of the body 20 and the second face 18b may be unitary with the second portion 20b of the body 20. As an example, the first face 18a or the second face 18b may be unitary with the body 20. In this example the entirety of the body 20 is unitary with either the first face 18a or the second face 18b. Unitary means a single, uniform piece of material with no seams, joints, fasteners, or adhesives holding it together, i.e., formed together simultaneously as a single continuous unit, e.g., by machining from a unitary blank, molding, etc.

The retractor 12 may be of any suitable material, e.g., plastic, metal, composite, etc. The first face 18a, the second face 18b, and the body 20 may each be of the same material or of a different material. The retractor 12 may be any suitable shape, e.g., cylindrical, cuboidal, etc. As shown in the Figures, the retractor 12 is cylindrical.

The retractor 12 may define the enclosure assembly 26. Specifically, the enclosure assembly 26 may be defined by the first face 18a, the second face 18b, and the body 20 of the retractor 12. In the example shown in the Figures, the enclosure assembly 26 includes a front cover 28a and a rear cover 28b. In the example shown in the Figures, the front cover 28a includes the first face 18a of the retractor 12 and the first portion 20a of the body 20 of the retractor 12. The rear cover 28b includes the second face 18b of the retractor 12 and the second portion 20b of the body 20 of the retractor 12. The enclosure assembly 26, i.e., the front cover 28a and the rear cover 28b, may be, for example, circular. The enclosure assembly 26 may be any suitable shape, e.g., cylindrical, cuboidal, etc.

The front cover 28a and the rear cover 28b may be attached to each other. In the example shown in the Figures, the front cover 28a includes the first portion 20a of the retractor body 20 and the rear cover 28b includes the second portion 20b of the retractor body 20. In this example, the inner diameter of the front cover 28a is equivalent to the inner diameter D1-a of the first portion 20a of the retractor body 20 and the outer diameter of the rear cover 28b is equivalent to the outer diameter D2-b of the second portion 20b of the retractor body 20. As shown in the Figures, the rear cover 28b fits inside the front cover 28a. Specifically, because the inner diameter of the front cover 28a is larger than the outer diameter of the rear cover 28b, the rear cover 28b fits inside the front cover 28a. The front cover 28a and the rear cover 28b may be attached in any suitable manner, e.g., ultrasonically welded, press fit, etc. In the example shown in the Figures, the front cover 28a and the rear cover 28b are ultrasonically welded.

The front cover 28a or the rear cover 28b may include a spindle 30. As shown in the example in the Figures, the front cover 28a includes the spindle 30. The spindle 30 is in the center of the front cover 28a and projects from the first face 18a toward the rear cover 28b along the axis A1. The spindle 30 may have a slot 32. As described further below, the retractor 12 may include a spring 34 having a first end 34a disposed within the slot 32. Specifically, the first end 34a of the spring 34 may fixed in the slot 32. The first end 34a of the spring 34 may be fixed in the slot 32 in any suitable manner, e.g., captured therein, press fit, using a fastener, mechanical connector, etc.

The enclosure assembly 26 may include a ring 36 between the front cover 28a and the rear cover 28b. The front cover 28a and the rear cover 28b may each include a notch 38. As shown in the Figures, the notch 38 is semi-circular. The ring 36 is sized and shaped to fit in the notch 38. As discussed further below the assembly includes a cord 40 that connects the handle 14 to the retractor 12. The cord 40 passes though the ring 36. The ring 36 is designed to reduce chafing at contact points, i.e., areas on the front cover 28a and/or the rear cover 28b where the cord 40 rubs. In other words, the ring 36 is friction reducing. The ring 36 may be fixed to the front cover 28a and/or the rear cover 28b in any suitable manner.

As shown in the Figures, the retractor 12 may include a winding assembly 42. The winding assembly 42 includes a body 44 having a central opening 46, a first cavity 48*a*, a second cavity 48*b*, and the spring 34. The winding assembly 42 is disposed within the retractor cavity 24. Specifically, the winding assembly 42 is disposed within the enclosure assembly 26. The winding assembly 42 may be installed in the enclosure assembly 26 under tension as discussed below.

The body 44 of the winding assembly 42 may be of any suitable material, e.g., plastic, metal, composite, etc. The body 44 is sized and shaped to rotate on a single axis, for example the axis A1, within the retractor cavity 24, as described further below. In the example shown in the Figures, the body 44 is circular, i.e., the body 44 has a constant radius. In this example, the body 44 has a central opening 46. The winding assembly 42 is supported on the second face 18*b* of the retractor 12 at the central opening 46. As shown in the Figures, the winding assembly 42 is supported opposite the clip 16 on the front cover 28*a* of the enclosure assembly 26. Specifically, the spindle 30 aligns with the central opening 46 and the winding assembly 42 is supported on the spindle 30 at the central opening 46. In other examples, the spindle 30 may project from the rear cover 28*b* toward the front cover 28*a* and the winding assembly 42 is supported on rear cover 28*b* and specifically on the spindle 30.

The body 44 of the winding assembly 42 may include an outer wall 50 as shown in the Figures. The outer wall 50 defines the first cavity 48*a*. The spring 34 may be disposed in the first cavity 48*a*. Specifically, the spring 34 may be wound within the first cavity 48*a*. The spring 34 may have a first end 34*a*. The first end 34*a* of the spring 34 may be connected to the enclosure assembly 26. Specifically, the spring 34 may be fixed in the slot 32 of the spindle 30. The spring 34 may be a constant force spring 34. Because the spring 34 is fixed in the slot 32 of the spindle 30, the winding assembly 42 can be installed in a manner that resists torsional rotation in one direction, i.e., installed under tension. The spring 34 may be, e.g., stainless steel. The spring 34 may be of any suitable material.

The winding assembly 42 may have a first flange 52*a* and a second flange 52*b*. The first flange 52*a* is spaced from the second flange 52*b* along the axis A1. As shown in the Figures, the first flange 52*a* and the second flange 52*b* extend radially outward from the outer wall 50. The first flange 52*a*, the second flange 52*b*, and the outer wall 50 define the second cavity 48*b* of the winding assembly body 44. The first flange 52*a* is adjacent the first face 18*a* of the retractor 12 and the second flange 52*b* is adjacent the second face 18*b* of the retractor 12. In some examples, the outer wall 50 along with the first and second flanges 52*a*, 52*b* can be in the form of a spool or drum around which the cord 40 is wound.

The retractor 12 includes the cord 40. As shown in the Figures, the cord 40 is disposed in the second cavity 48*b*. Specifically, the cord 40 may be wound around the outer wall 50 when the handle 14 is in the stowed position. Specifically, when the handle 14 is in the stowed position the cord 40 is disposed between the outer wall 50 and the body 20 of the retractor 12. When the cord 40 is wound around the outer wall 50, the cord 40 is between the first flange 52*a* and the second flange 52*b* of the winding assembly 42. The cord 40 is wound around the outer wall 50 in a manner such that when the cord 40 is unwound, i.e., pulled, the cord 40 is under tension. Specifically, the spring 34 resists the unwinding of the cord 40 and when tension on the cord 40 is released the cord 40 is retracted onto the winding assembly 42, i.e., re-wound.

The cord 40 has a first end 40*a* and a second end 40*b*. The second end 40*b* of the cord 40 is spaced from the first end 40*a*. As shown in the Figures, the cord 40 is connected to the retractor 12 at the first end 40*a* and the cord 40 is connected to the handle 14 at the second end 40*b*. The cord 40 is connected to the winding assembly 42. Specifically, the first end 40*a* is fixed to the body 44 of the winding assembly 42. The first end 40*a* of the cord 40 may be fixed to the body 44 of the winding assembly 42 in any suitable manner, e.g., a knot, or friction fit into the body 44. The second end 40*b* of the cord 40 may be fixed to the handle 14 in any suitable manner, e.g., a knot, a mechanical stopper, etc.

As shown in the Figures, the first end 40*a* of the cord 40 is the portion of the cord 40 that connects to the body 44 of the winding assembly 42. Where the cord 40 is fixed to the winding assembly 42 with a knot, the entirety of the knot is the first end 40*a*. Similarly, as shown in the figures, the second end 40*b* of the cord 40 is the portion of the cord 40 that connects to the handle 14. Where the cord 40 is fixed to the winding assembly 42 with a knot, the entirety of the knot is the second end 40*b*. Alternatively, the first end 40*a* and/or the second end 40*b* may be the terminal ends of the cord 40. The cord 40 has a tensile strength. The tensile strength of the cord 40 is at least 2,500 MPa. The cord 40 may be, e.g., aramid fiber, or any suitable material.

The assembly includes the handle 14. The handle 14 is sized and shaped to fit around the enclosure assembly 26. As shown in the Figures, the handle 14 is cylindrical with a central opening 54. The handle 14 includes a first wall 56*a* and a second wall 56*b* radially spaced from the first wall 56*a*. The central opening 54 is defined by the first wall 56*a*. As shown in the Figures, the first wall 56*a* of the handle 14 is between the body 20 of the retractor 12 and the second wall 56*b* when the handle 14 is in the stowed position, as shown in FIG. 1. The handle 14 has a first end 58*a*. The first end 58*a* of the handle 14 includes a chamfer 60 on the first wall 56*a*. The chamfer 60 extends continuously around the handle 14 on the first wall 56*a*. The handle 14 has a second end 58*b*. In the example shown in the Figures, the second end 58*b* is flush with the first face 18*a* of the retractor 12 when the handle 14 is in the stowed position.

The second end 40*b* of the cord 40 may be attached to the handle 14. Specifically, the handle 14 may have an opening 62 between the first wall 56*a* and the second wall 56*b* as shown in the Figures. In the example shown in the Figures, the cord 40 passes through the opening 62 from the first wall 56*a* to the second wall 56*b*. The second end 40*b* of the cord 40 is disposed adjacent the second wall 56*b* and may be secured to the handle 14 in any suitable manner, e.g., a knot, mechanical stopper, etc.

As shown in FIG. 1, the handle 14 has a stowed position. In the example shown in the Figures, in the stowed position the handle 14 is supported on the enclosure assembly 26. Specifically, the handle 14 is designed to fit over the enclosure assembly 26 in the stowed position. The handle 14 is sized and shaped to fit around the enclosure assembly 26 in the stowed position. In some examples, the handle 14 is cylindrical and is designed to concentrically mate together with the enclosure assembly 26 when the handle 14 is in the stowed position. Specifically, the handle 14 is sized and shaped to stay in the stowed position when the cord 40 is under tension. Because the cord 40 is under tension from the winding assembly 42, in the stowed position the handle 14 stays in the stowed position. The enclosure assembly 26 and the handle 14 are shown and described as circular and/or cylindrical. The enclosure assembly 26 and the handle 14 may have any suitable shape. For example, the enclosure assembly 26 may be cuboidal, i.e., a cuboid, and the handle 14 can have a corresponding rectangular shape that mates with the enclosure assembly 26. In this example, the handle 14 is at least partially congruent with the enclosure assembly 26.

Figure 6:
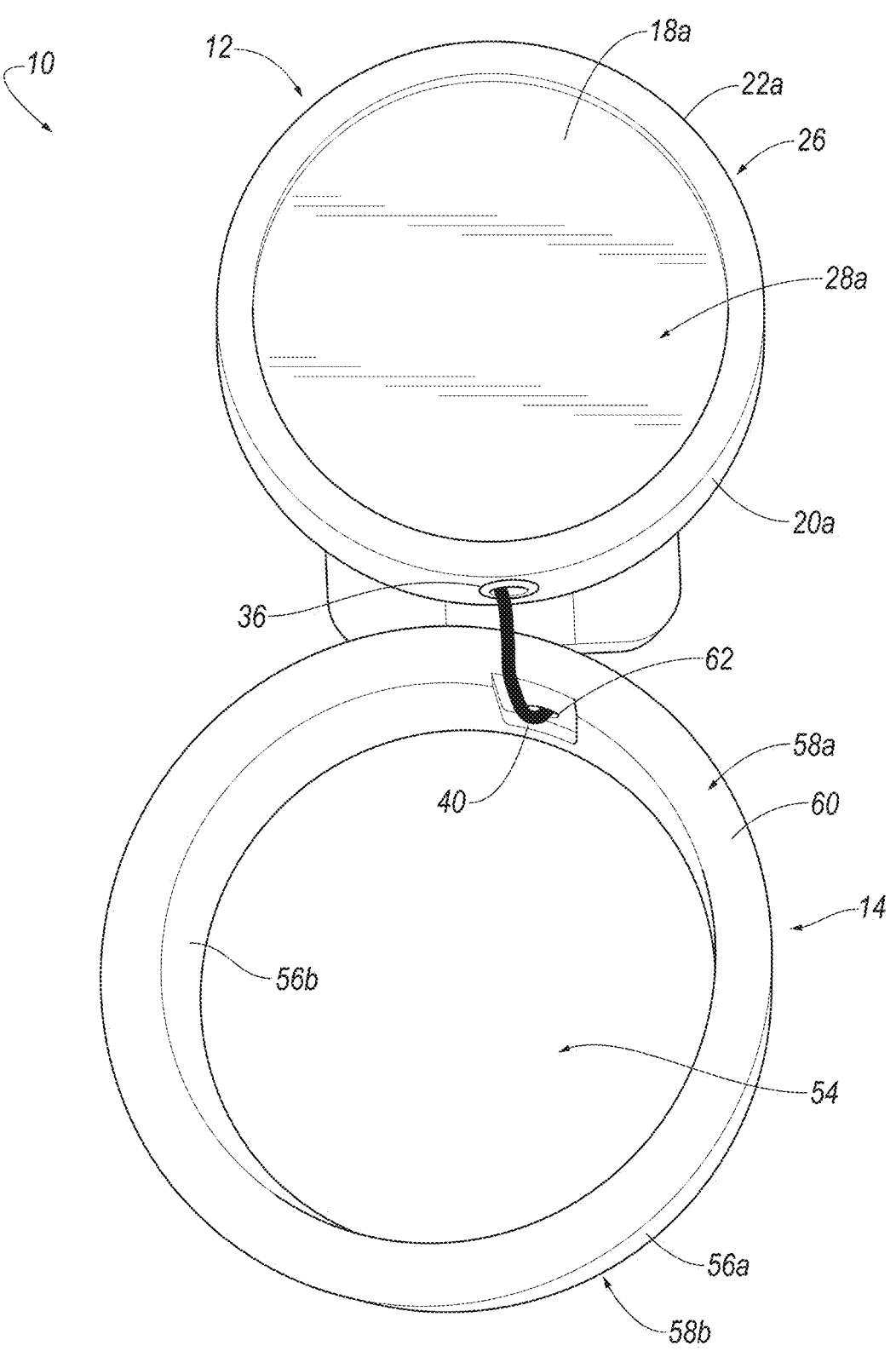
FIG. 6 is a perspective view of the assembly with the handle in the deployed position with the cord retracted.
Figure 7:
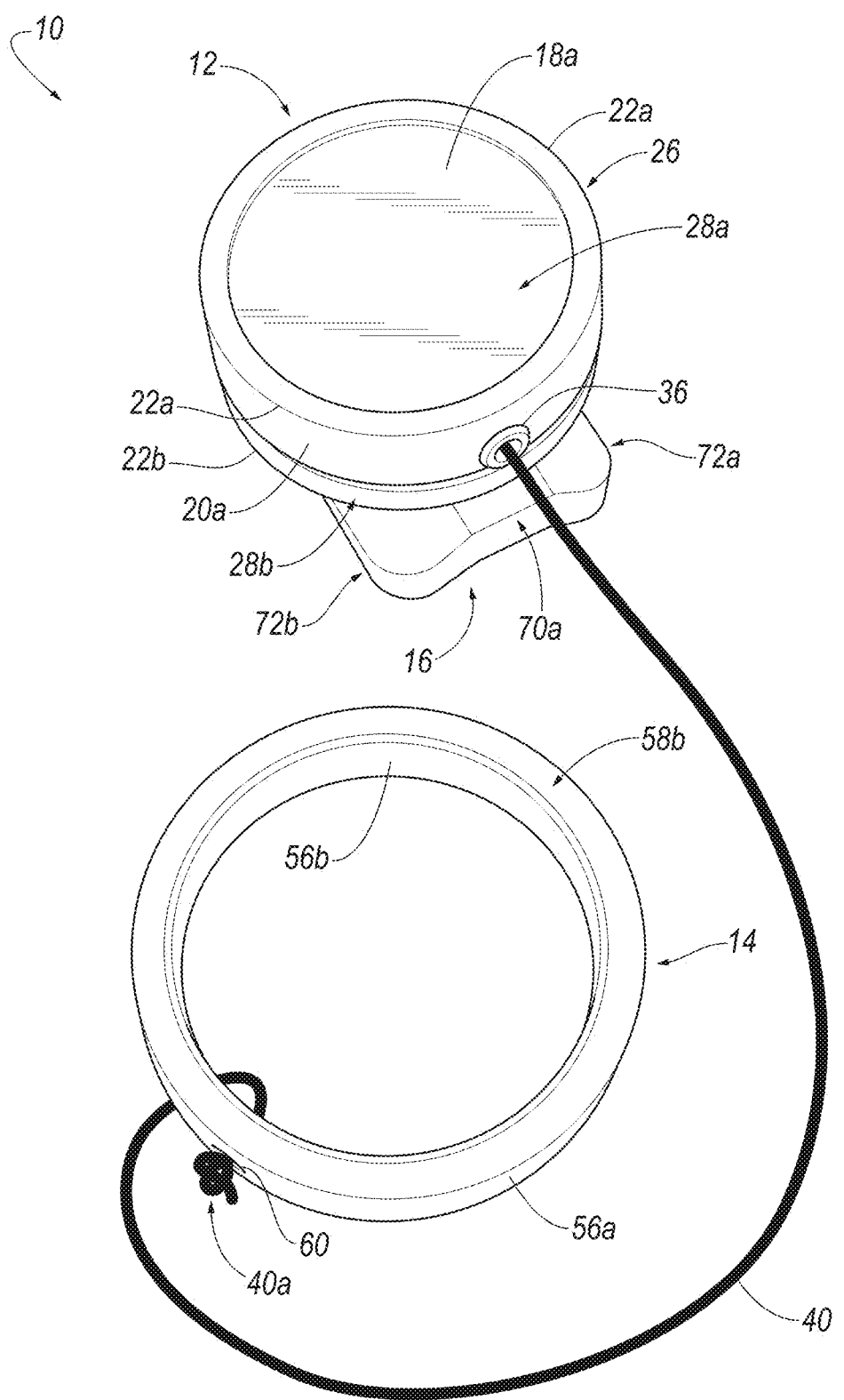
FIG. 7 is a perspective view of the assembly with the handle in the deployed position with the cord partially extended.

As shown in FIGS. 1, 6, and 7, the handle 14 has a deployed position. In the deployed position, the handle 14 may be, for example, held by the handler or pet owner. The handler may move the handle 14 from the stowed position to the deployed position by sliding the handle 14 off of the enclosure assembly 26 and extend the cord 40 from the enclosure assembly 26 via the handle 14. Because the cord 40 is under tension from the winding assembly 42, the winding assembly 42 retracts any slack in the cord 40. When the handler or pet owner releases the handle 14, the handle 14 is retracted toward the retractor 12. In other words, handle 14 is retractably connected to the retractor 12 by the cord 40.

The assembly also includes the clip 16. As shown in the Figures, the clip 16 is supported by the enclosure assembly 26. Specifically, the clip 16 is connected to the enclosure assembly 26 by a fastener 76. The clip 16 is rotatable about the axis A1 and specifically rotatable on the fastener 76. In other words, the clip 16 can rotate about the axis A1 while the fastener 76 remains stationary or fixed. The fastener 76 may be, for example, a threaded fastener that includes a nut on one end. The fastener 76 may be, for example, a hollow tube with flared ends. The fastener 76 may be any suitable fastener 76 known in the art that allows the clip 16 to rotate freely about the axis A1 while remaining connected to the enclosure assembly 26. The clip 16 is designed to rotate about the axis A1 so that when the handle 14 is in the deployed position, the cord 40 can extend from the enclosure assembly 26 while minimizing friction on the enclosure assembly ring 36.

The clip 16 includes a clip body 64 and a plurality of arms 68 extending from the clip body 64. The clip body 64 of the clip 16 has a first end 70*a* and a second end 70*b* spaced from the first end 70*a*. The clip body 64 is elongated from the first end 70*a* to the second end 70*b*. The clip body 64 has a first side 72*a* and a second side 72*b* spaced from the first side 72*a*. The first side 72*a* and the second side 72*b* each extend from the first end 70*a* to the second end 70*b*.

The plurality of arms 68 are connected to the clip body 64. As shown in the Figures, the plurality of arms 68 includes a first arm 68*a*, a second arm 68*b*, an third arm 68*c*, and a fourth arm 68*d*. The first arm 68*a*, the second arm 68*b*, the third arm 68*c*, and the fourth arm 68*d* are L-Shaped.

The first arm 68*a* and the third arm 68*c* are connected to the first end 70*a* of the body 64. Specifically, the first arm 68*a* extends from the first side 72*a* at the first end 70*a* and the third arm 68*c* extends from the second side 72*b* at the first end 70*a*. The first arm 68*a* and the third arm 68*c* extend toward the second end 70*b*. The first arm 68*a* and the third arm 68*c* each have a terminal end 74.

The second arm 68*b* and the fourth arm 68*d* are connected to the second end 70*b* of the clip body 64. The second arm 68*b* extends from the first side 72*a* at the second end 70*b*. The fourth arm 68*d* extends from the second side 72*b* at the second end 70*b*. The second arm 68*b* and the fourth arm 68*d* extend toward the first end 70*a*. The second arm 68*b* and the fourth arm 68*d* each have a terminal end 74. The terminal end 74 of the first arm 68*a* is spaced from and opposite the terminal end 74 of the second arm 68*b*. The terminal end 74 of the third arm 68*c* is spaced from and opposite the terminal end 74 of the fourth arm 68*d*. As shown in the Figures, the clip 16, or other suitable connector may, for example, secure the assembly to the collar or harness of a pet or child.

Because the clip 16 attaches the assembly to the dog's collar, the handler or pet owner can quickly move the handle 14 between the stowed position to the deployed position as needed without needing to attach and remove the leash constantly. As one example, a dog may become excited when a person knocks on the front door of a house. The handler or pet owner can grab the handle 14 of the assembly and control the dog while addressing the person at the door.

The assembly may include a near-field communication tag ("NFC tag"). The NFC tag may be connected to the enclosure assembly 26. The NFC tag may include a memory and an induction coil. The memory of the NFC tag may include, for example, a website address that when read by an NFC reader directs the NFC reader to open the website. In some examples, the NFC tag may operate and/or be of suitable construction as is known in the art.

The assembly, specifically the winding assembly 42, the enclosure assembly 26, the handle 14, and the clip 16, may be made of any suitable material, e.g., metal or plastic, using any suitable manufacturing process, e.g., machining, injection molding, etc.

The invention claimed is:

1. An assembly comprising:
   a retractor having a first face, a second face, and a body;
   the first face being spaced from the second face on an axis;
   the body extending between the first face and the second face along the axis;
   a clip supported on the second face;
   a handle having a stowed position;
   the handle in the stowed position being adjacent the body between the first face and the second face; and
   the handle being retractably connected to the retractor.

2. The assembly of claim 1, including a cord having a first end and a second end spaced from the first end, the cord being connected to the handle at the first end and being connected to the retractor at the second end.

3. The assembly of claim 2, wherein the handle is retractably connected to the retractor by the cord.

4. The assembly of claim 2, wherein the handle has an inner wall and an outer wall, the inner wall of the handle being between the body and the outer wall of the handle when the handle is in the stowed position, the first end of the cord passing from the inner wall of the handle to the outer wall of the handle, the first end of the cord terminating in a knot, and the knot abutting the outer wall.

5. The assembly of claim 1, wherein a cavity is defined by the first face, the second face, and the body, the retractor includes a winding assembly disposed in the cavity.

6. The assembly of claim 5, including a cord being connected to the winding assembly.

7. The assembly of claim 6, wherein the winding assembly includes an outer wall, a first flange, and a second flange, the cord being wrapped around the outer wall between the first flange and the second flange when the handle is in the stowed position.

8. The assembly of claim 7, the cord being disposed between the outer wall and the body of the retractor when the handle is in the stowed position.

9. The assembly of claim 7, wherein the first flange is adjacent the first face.

10. The assembly of claim 7, wherein the second flange is adjacent the second face.

11. The assembly of claim 1, wherein the retractor includes an enclosure and a winding assembly disposed within the enclosure.

12. The assembly of claim 11, wherein the enclosure is defined by the first face, the second face, and the body.

13. The assembly of claim 11, wherein the handle in the stowed position is supported on the enclosure.

14. The assembly of claim 1, wherein the retractor and the handle are cylindrical and concentrically mated together when the handle is in the stowed position.

15. The assembly of claim 1, wherein the handle includes a first wall and a second wall radially spaced from the first wall, the first wall being between the body and the second wall when the handle is in the stowed position.

16. The assembly of claim 1, wherein the handle has a first end, the first end being flush with the first face of the retractor when the handle is in the stowed position.

17. The assembly of claim 1, wherein the clip includes a clip body and a plurality of arms extending from the clip body, the plurality of arms being L-shaped.

18. The assembly of claim 17, wherein the clip body has a first end and a second end, the plurality of arms include a first arm, a second arm, a third arm, and a fourth arm, the first arm and the third arm being connected to the first end of the clip body and extending away from the clip body and extending toward the second end, the second arm and the fourth arm being connected to the second end of the clip body and extending away from the clip body and extending toward the first end.

19. An assembly comprising:

an enclosure having a front cover and a rear cover;

a winding assembly disposed within the enclosure between the front cover and the rear cover;

a handle having an inner wall and an outer wall;

a cord having a first end connected to the handle and a second end connected to the retractor;

the handle being moveable between a deployed position and a stowed position;

the handle in the stowed position being supported on the enclosure;

the inner wall of the handle being between the enclosure and the outer wall of the handle when the handle is in the stowed position;

the first end of the cord passing from the inner wall of the handle to the outer wall of the handle, the first end of the cord terminating in a knot, the knot abutting the outer wall;

a clip mounted on the enclosure for attachment to a collar.

20. An assembly comprising:

an enclosure having a front cover and a rear cover;

a winding assembly disposed within the enclosure between the front cover and the rear cover;

a handle having an inner wall and an outer wall;

a cord having a first end connected to the handle and a second end connected to the retractor;

the handle being moveable between a deployed position and a stowed position;

the handle in the stowed position being supported on the enclosure;

the inner wall of the handle being between the enclosure and the outer wall of the handle when the handle is in the stowed position;

the first end of the cord passing from the inner wall of the handle to the outer wall of the handle, the first end of the cord terminating in a knot, the knot abutting the outer wall;

a clip mounted on the enclosure for attachment to a collar;

the clip includes a body and a plurality of arms extending from the body, the plurality of arms being L-shaped; and the body having a first end and a second end, the plurality of arms include a first arm, a second arm, a third arm, and a fourth arm, the first arm and the third arm being connected to the first end of the body and extending away from the body and extending toward the second end, the second arm and the fourth arm being connected to the second end of the body and extending away from the body and extending toward the first end.

* * * * *